May 6, 1969

J. G. LARSON

3,442,409

TRANSPORT VEHICLE

Filed Feb. 27, 1967

INVENTOR.
JOHN G. LARSON
BY Robert J. Henry
ATTORNEY

May 6, 1969

J. G. LARSON 3,442,409

TRANSPORT VEHICLE

Filed Feb. 27, 1967

INVENTOR.
JOHN G. LARSON
BY Robert J. Henry
ATTORNEY

FIG. 12

United States Patent Office 3,442,409
Patented May 6, 1969

3,442,409
TRANSPORT VEHICLE
John G. Larson, Pleasant Hill, Calif., assignor to
Beverly A. Larson, Pleasant Hill, Calif.
Filed Feb. 27, 1967, Ser. No. 618,936
Int. Cl. B60p *1/02;* B62d *53/06*
U.S. Cl. 214—512                                    22 Claims

ABSTRACT OF THE DISCLOSURE

The present invention relates to a transport vehicle constructed with a bed adjustable as to its area size, and capable of handling very large and/or heavy loads, and which is equipped with retractable caster-type wheels to render it capable of self-loading and unloading, with the caster wheels including a plurality of wheels mounted on a crank axle and fluid means whereby the wheels are self-compensating and provide an equal distribution of the load as the vehicle travels over irregular contours.

Background of the invention

The present invention relates to improvements in a transport vehicle, and more particularly to a transport vehicle which has foldable parts and is constructed to handle heavy equipments.

Movement of heavy equipment into installation position has always been a difficult problem, and usually such jobs are "tailored," that is, the operation is designed for each particular job using general equipment. For example, when it is desired to move heavy items such as electric generators, chemical plant apparatus or other pieces of equipment into an installation site, the equipment must be moved from the place of manufacture or a barge, railroad car or some other main transport vehicle onto a specified position. Makeshift supports are generally placed under the items, and expensive units such as cranes and the like used for handling. This means that the moving contract is expensive and difficult to carry out.

Similarly, when it is desired to move a house or other heavy building the support is generally built up to fit the size of the structure with each system varied according to the job. Since house movement usually requires a special permit, it is desirable to keep the size to a minimum, and therefore the support platform is built to fit the particular house.

Increased construction of freeways, which requires removal of buildings, and the use of heavier equipment, has made these problems more acute; and there is a serious need for a special vehicle that will be adaptable to handle jobs of various weights and dimensions. It is particularly desirable to provide such a vehicle that will be able to move into position to load itself and then deliver the work where wanted without intermediate transfer by crane or the like. When makeshift equipment is used, it is often particularly difficult to make minor maneuvers which are needed to accurately place the item to be moved in the desired accurate installation position, and for making other difficult moves. In addition, these moves must be made with minimal or no damage to the article being moved. It is a particularly serious problem when items such as houses are moved, because houses are difficult to load without injury thereto.

These and other problems have made it desirable to provide a special piece of equipment capable of moving heavy articles in such a manner that these problems are overcome. Attempts have been made to provide special loading and carrying devices, but prior to this invention none of the pieces of equipment were suitable for handling heavy items without leaving certain of the problems mentioned above unsolved.

Summary of the invention

It is therefore a primary object of this invention to provide a transport vehicle which is capable of being easily moved into loading and unloading position, and which is constructed to perform such movements as well as the loading, unloading and carrying of the heavy objects.

Another object of the invention is the provision of a transport vehicle of the character described which is constructed to provide an adjustable bed, with the adjustment being provided for both length and width, and with both adjustments operable through a rather large range.

A further object of the invention is the provision of a transport vehicle of the character described which includes means in the form of retractable wheels for assisting in the loading and unloading operations with the means being suitable for use in many different types of loading and unloading operations.

Still another object of the invention is to provide a transport vehicle which has a caster type wheel mount capable of providing horizontal movement in any direction to allow for load alignments, special moves, sharp turns and other maneuvering advantages.

A still further object of the invention is to provide a transport vehicle of the character described which is not only capable of supporting extra large items, but also is capable of being adjusted into a relatively small vehicle to facilitate movement when empty and allow the empty transport vehicle to move without need for special permits or the like.

Yet still another object of the invention is to provide a transport vehicle of the character described, which may be equipped with conventional accessory devices such as brakes, steering and the like.

Yet a further object of the invention is the provision of a transport vehicle of the character described, which has a special wheel suspension system for retaining a plane load bed as the vehicle is moved over terrain having irregular contours.

Further objects and advantages will become apparent as the specifications continue, and the new and useful features of this transport vehicle will be fully defined in the claims attached hereto.

In general, the transport vehicle of this invention comprises a pair of main support beams for providing a supporting surface or load bed, and a retractable wheel assembly on each of the support beams for raising and lowering the main support beams and facilitating movement of the empty and loaded vehicle, said wheel assemblies being mounted for rotation about a vertical axis for providing movement of the vehicle in any direction.

The main support means should be constructed strong enough that two beams can support a very heavy load, yet the support beams should be of sufficiently small dimensions that they can be easily inserted under a load for lifting and for removal after transport of the unit being moved. Each beam is preferably of adjustable length by telescoping at one or both ends. Preferably, each beam has a main section framed with a box-like shape and has front and/or rear extension members telescoped within the main section. These extensions should fit rather closely to provide the desired strength, and, in the preferred form, are powered to facilitate adjustment and assist in locating the beams under the load. In addition, these adjustments allow the operator to locate the suspension to conform to various different loads.

The retractable wheel assemblies are important to provide wheeled support for the vehicle during movement, and the retractable nature allows the transport vehicle to be adjusted to facilitate insertion under loads for lifting same and making the vehicle self-loading and unloading. The vehicle is preferably constructed to handle loads where clearance is minimal. For example, in the movement of buildings such as houses, there is frequently a crawl space of about 18 inches under the main house frame, and the support surface of the device of the invention can be lowered below such a height. In many applications other than house moving, the load will also be too low to fit ordinary vehicles but the vehicle of this invention may be used by retracting the wheels. Accordingly, it is easier to move many different types of loads that need to be lifted, by using the device of this invention.

The preferred wheel assemblies are not only retractable, but they are also each mounted about a vertical axis so the wheel's assemblies will be rotatable and the vehicle may be moved horizontally in any direction. This movement is important in allowing the vehicle to maneuver into difficult positions, move around corners, and facilitate other difficult movements. Preferably, the mounting is a caster mounting which follows freely when desired. However, it will be appreciated that one or more of such casters may be held in a steered position, if desired, or held in a given position by means of suitable locking devices.

The retractable wheels may be used as elevator means to raise and lower the main support beams and thereby raise and lower the article being moved. It is also desirable to provide auxiliary elevator means which are preferably mounted directly on the vehicle, although it will be appreciated that such means could also be independently provided. The auxiliary elevator means and retractable wheels should preferably provide substantially all the lift in three somewhat concentrated positions or have each lift system internally compensating to give a three point suspension of the effect thereof. This is important in preventing strains on the article being moved, for example, it is particularly important in lifting a house from its foundation to a moving position and lowering it into installation position.

Thus, in the preferred form of the invention, the retractable wheels each provide two of the three lifting means, and the auxiliary elevator means is provided on the connecting or coupling structure, where the vehicle is coupled to a prime mover. Ideally, the prime mover will be adapted to be used with the transport vehicle of this invention. However, it will be appreciated that any of a large number of prime movers could be used to draw the transport vehicle of this invention as well as to provide power and other functions.

In general, the coupling will be part of a yoke or connecting means that will connect the beams to the prime mover. However, the yoke should be laterally adjustable in order to accommodate various widths of the transport vehicle. Preferably, the yoke will also be carried on a single pivotal coupler on the prime mover such as a ball and socket joint of the conventional "fifth wheel" now used on house trailer, truck tractor and semi-trailer units. Preferably, the yoke will also include the auxiliary elevator means which may include one or more elevator units.

It is important that the yoke be laterally adjustable in order to adjust the spacing between the main beams from a close parallel relation to a rather widely spaced relation. In the present invention this adjustment is obtained by either pivoting two connecting arms or providing arms of variable length or both. For example, a single bolster could be provided with the bolster having an adjustable length. Such a bolster would be connected to a forward position of the main beam at each of its ends, and have its mid-portion mounted on a pivotal mount on the prime mover. In order to maintain the mount at the mid-point, both ends of the bolster should be adjustable.

In a preferred form of the invention, the yoke is in the form of a Y or V with the arms thereof being relatively pivotal and also of adjustable length with the pivot point being mounted over or near the fifth wheel structure. This form allows for better load distribution or, in effect, shortens the length of the overall vehicle as compared to the single bolster construction. The V form can be doubled to an X form, if desired, with the advantage of better control, but the disadvantage of weight and cost factors.

The auxiliary elevator means may be a single elevator unit positioned above the fifth wheel structure, but it is preferred to use two elevator units at the connecting areas between the rear end of the yoke and the forward end of each of the two main beams. This location of the auxiliary elevator means provide better transfer to towing forces between the prime mover and vehicle, and better suspension balance. With this construction, the lift is suspended on one pivot point at the fifth wheel, which preferably should have a universal pivot. This pivot point also would accommodate special operations such as moves laterally along a rather steep grade while maintaining the load level.

Each of the elevator means and each auxiliary elevator unit should be power operated, and preferably all of the units are powered by fluid power means capable of receiving power from the prime mover. Moreover, powered means should also be provided for adjusting the extensions of the main beams, and these means are preferably operated by fluid motors. Other auxiliary units that may be provided, such as steering means, are best powered. While it is preferred to use fluid power such as hydraulic power units, it will be appreciated that some of the power units could be electric or some other source of power, without departing from the spirit of the invention.

Fluid power means and electric power means are used to save valuable space, because these units can deliver a large amount of power from relatively small units. The energy source to energize these power units is preferably external to the transport unit and the prime mover is a convenient energy source. Certain of the power units will be motors such as fluid motors and other power means are preferably fluid cylinders such as hydraulic rams. For example, in the preferred form of the invention the elevator means and auxiliary elevator means utilize a plurality of hydraulic rams.

The rear ends of the beams are preferably constructed in such a form that insertion under a load may be achieved by pushing the beams under a load. Thus the rear ends should not dig into the ground when pushed. This insertion may be facilitated by using the powered units provided to extend the extendable beams, by extending the beams under the load, holding the rear end, contracting the beams, and then extending the beams again while holding the front end, to worm the unit in the desired position. In some cases, the split beams can be positioned around from each side of the load, as in removing lading or unloading from flat cars. Here again, the power units and special construction are valuable for providing close maneuvering.

As indicated above, the preferred transport unit is constructed with castered wheels, and it is preferred to use a drum caster having plurality of mounted wheels clustered on a unit carried by each drum or equivalent. One or more retractable frames will be carried on the drum and each frame is equipped with an elevator unit such as a hydraulic ram. The casters are mounted so that the unit retracts to fit into spaces within the main beam so that minimal thickness is maintained. In other words, the unit retracts either clear into the frame or into the frame an amount such that only a small wheel protrusion is left. It is preferred to have the wheels protrude an inch or two below the main frame when the unit is retracted to provide easier sliding of the unit under loads.

It is also a feature of the preferred form of the invention to provide load balancing between units and individual wheels to allow travel over irregular contours without placing heavy stress on any single wheel or unit. Balancing between units is achieved by using fluid power which can be connected by operating suitable valves so that the same fluid pressure will be present on certain groups of units. However, it will be appreciated that in extreme cases as in climbing over obstacles, that the units should be operated separately, and isolation is achieved by closing certain valves.

The wheels in each cluster are self compensating by a special mounting in the form of multiple pivots allowing the individual wheels to assume various heights with their load concentrated on a single bearing on the bottom of the pivoted support or swing frame. In the form herein shown, each cluster consists of four wheels with two laterally disposed wheel elements, each consisting of two tandem wheels. Each laterally disposed wheel element is carried on a mounting having a system support adjustable in gross with respect to height, and in operative association with the other. The system support also provides for the forward and rear wheel of each tandem pair to be carried on a common but pivotal mount. In this way, all four wheel units bear substantially equally on the ground, and all bear as a unit on their mounting at the lower end of the swing frame.

In certain designs of the invention, the castering radius exceeds one-half of the width of the main beam. Since it is desirable to have the load rest on the beams, it is important to avoid an imbalance that could occur if all the casters are positioned laterally on one side. In the form here shown, a multiplicity of casters are provided with at least one caster of each beam equipped for steering. In such a case, the operator can position the steered caster to a forward or lead position while the free moving casters assume a rear position so that the casters extend from each side. This will retain stability for the extreme lateral position.

Another way of solving this problem, in some applications, is the use of tie bars extending between the beams. In the form shown, the main beams and extensions are provided with holes through each member of the beams, with the holes in alignment so that tie bars can be placed through the holes and positively provide lateral stability. These tie bars are preferably completely removable so that the unit can be laterally adjusted without them, and then the bars of the desired length are inserted.

It is intended that casters equipped for steering shall use worm or other power transfer devices that will tend to retain a given position when power is no longer being applied. The free following casters in their preferable form would be equipped with locking or locating devices which would fix them in proper position for retraction, or to prevent lateral movement on extreme lateral grades, or for backing lateral movements, and other maneuvers.

It will be appreciated that various designs can be provided, and in certain cases, the caster arm length will not exceed one-half of the width of the main beam. It will also be appreciated that brakes and other auxiliary units could be added to the transport vehicle of this invention and still be within the ambit thereof.

*Brief description of the drawings*

The preferred form of the invention is illustrated in the accompanying drawings forming a part of this decription, in which.

While only the preferred form of the invention is shown, it should be understood that various changes or modifications may be made within the scope of the claims attached hereto without departing from the spirit of the invention.

*Description of the preferred embodiment*

Referring to the drawings in greater detail, there is shown a transport vehicle 12 comprising a pair of main support beams 13 and 14, and a yoke 16, which is connected to the main support beams and adapted to be carried on a prime mover 17. The yoke 16 is constructed to ride on the prime mover in a manner permitting free pivoting in a horizontal plane together with some vertical pivoting. In the form here shown, the prime mover has a special fifth wheel 18 (see FIGURE 4) for receiving and carrying the yoke.

Each of the main support beams 13 and 14 are similarly constructed and each beam includes a main support section 19, and a rear extension member 21. Although the form here shown has only rear extensions, it should be understood that forward extensions could be used, if desired. In such a case, the yoke would be attached to the forward extensions instead of the main beams. The advantage of using forward extensions would be to position the wheel assemblies carried by the main support sections farther to the rear of the vehicle, but the overall length achieved by the extensions is about the same in each case because the rear extensions telescope through substantially the entire length of the main sections.

Thus it is preferred to construct the beam sections with a substantially complete telescoping of two parts. With this construction, it is possible to obtain the maximum extensibility because of a single overlap of the overlapping sections when maximum extension is achieved. In the form shown, the extension members are rear extensions so that the yoke may be connected directly to the main section of the beam. However, it should be appreciated that the rear extension could be omitted and forward extensions used which extend substantially entirely through the length of the main beams. In such a case, the yoke would be attached to the forward extensions.

Figure 2:
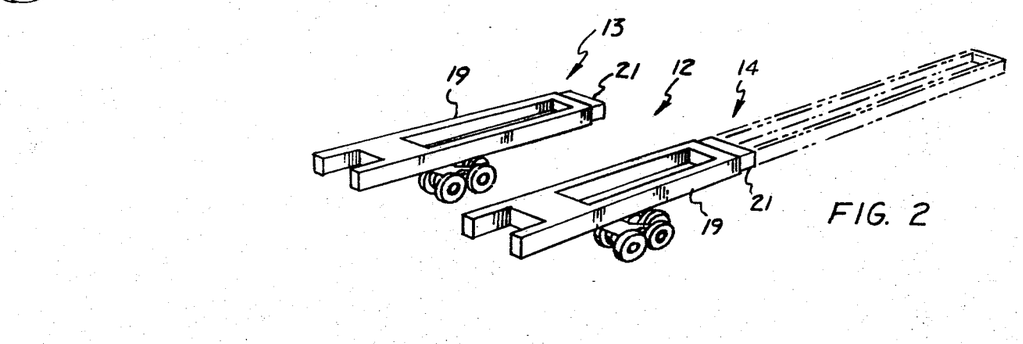
FIGURE 2, a perspective view of the rear end of the transport vehicle of FIGURE 1.

Each of the main support sections 19 of the main support beams 13 and 14 contain two box shaped structures 22 and 23 (see FIGURE 2) joined together by one or more carriage housings 24, front connecting housing 26 and rear connecting housing 27. While these connecting structures are generally sufficient, it will be appreciated that auxiliary transverse connecting members could be added, if desired.

Figure 6:
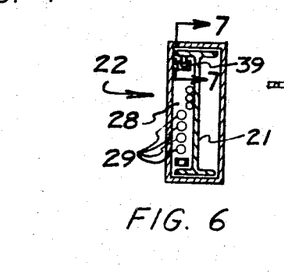
FIGURE 6, an enlarged cross-sectional view of a member of a main beam substantially as seen in the plane of line 6—6 of FIGURE 3.

Referring more particularly to FIGURE 6, it is seen that the box-like structure 22 of each main support section 19 is generally rectangular in cross-section and formed to receive an I-beam structure in close but sliding relation. The I-beam structure here used is one of a pair of I-beams used in the rear extension member 21. This structure provides great strength while still providing a minimal height to the support. In addition, a channel 28 is formed between the rear extension 21 and the box of the main support section, and this channel is utilized to carry the various fluid conduits 29 and wires (not shown) which extend between a control console 31 (see FIGURE 1) and the various powered units. In this way, the channel provides excellent protection for these conduits and wires.

Figure 3:
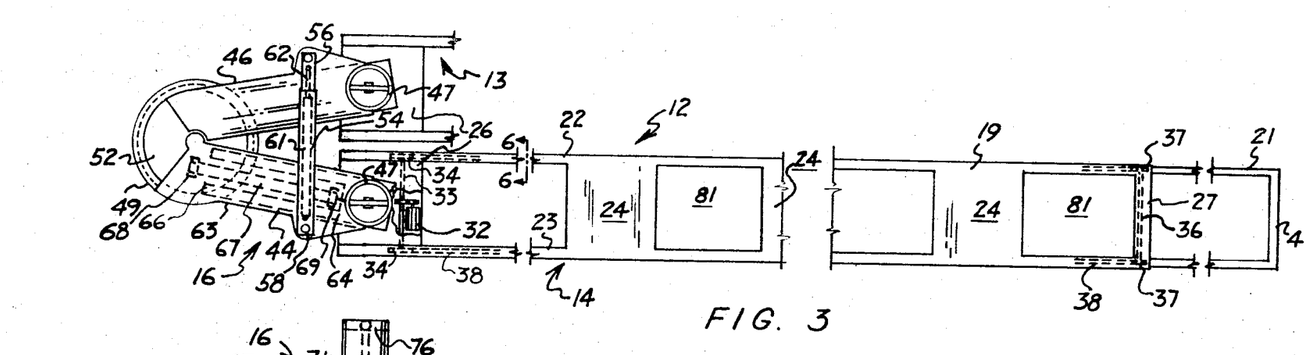
FIGURE 3, a plan view of the transport vehicle shown in FIGURES 1 and 2, with sections broken away.
Figure 7:
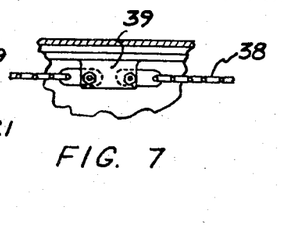
FIGURE 7, an enlarged view of a portion of the beam member shown in FIGURE 6 substantially as seen in the plane of line 7—7 thereof.

The channel also serves to hold and protect certain of the drive elements used to power the extension whereby it may be moved to different positions by powered means. Referring more particularly to FIGURES 3, 6 and 7, the powered drive means for effecting this adjustment comprises a fluid motor 32, drivingly connected to drive shaft 33, which is journaled into and extends through a wall of each of two main support sections, and has a sprocket 34 on each end in channel 28. The fluid motor and associated drive shaft are housed in the front connecting housing 26, and an idler shaft 36 and pair of sprockets 37 are housed in the rear connecting housing 27. The idler shaft and sprockets are journaled through walls of the main support section as in the case of the drive shaft and the idler sprockets are positioned in channels 28 of box structures 22 and 23 respectively.

An endless chain 38 is looped around each sprocket pair including a drive sprocket and idler sprocket, and this chain is used to drive the corresponding rear extension I-beam to which it is attached through lug 39 (see FIGURE 7). This lug is fastened to the I-beam or rear extension by bolts or welding and is constructed to serve as a section of the chain, being connected to chain links at each end. The rear extension is formed to telescope clear into the main beam, and the lug is positioned to allow this move. It should be noted that the rear extensions are thus positively driven through both portions thereof to prevent jamming, and it will be noted that the pair of I-beams of each rear extension has a connecting member 41 to tie them together and increase the strength of the whole extension.

It will also be appreciated that the various members are constructed to provide maximum strength where the stresses are greatest, and that excess metal and weight are best avoided. In the form here shown, a plurality of holes 42 are provided in the main support section and in the rear extensions. These holes tend to lighten the weight and to provide holding means for auxiliary cross beams (not shown), which are in the form of pipes adapted to fit through the holes and across the entire vehicle. In this way additional strength and stability as well as loading aids may be provided if desired.

Figure 1:
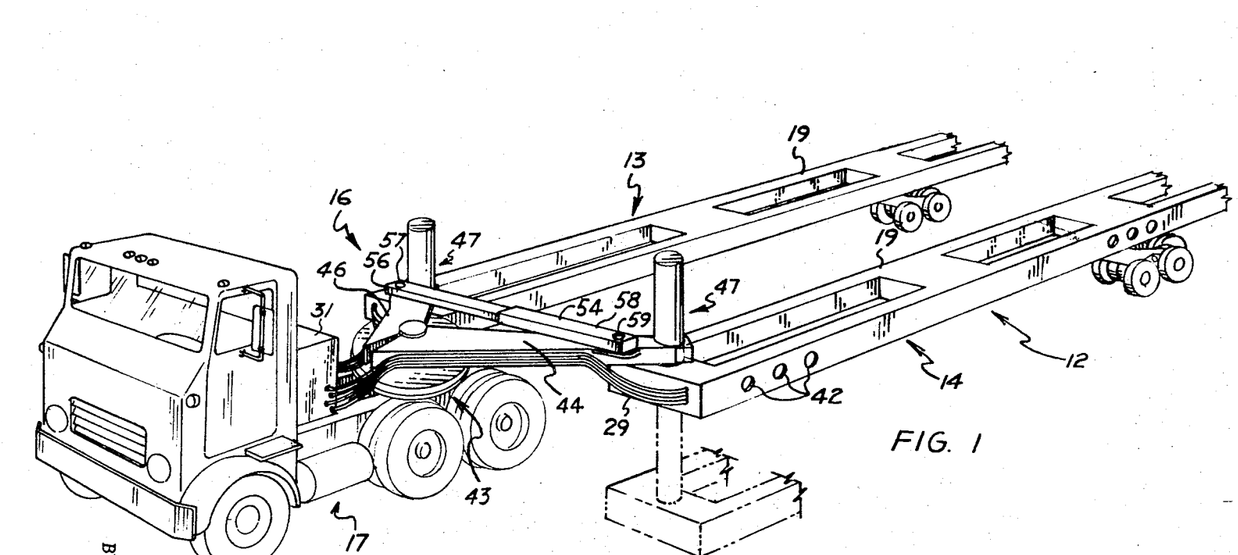
FIGURE 1 is a perspective view of the front end of a transport vehicle constructed according to the invention.
Figure 4:
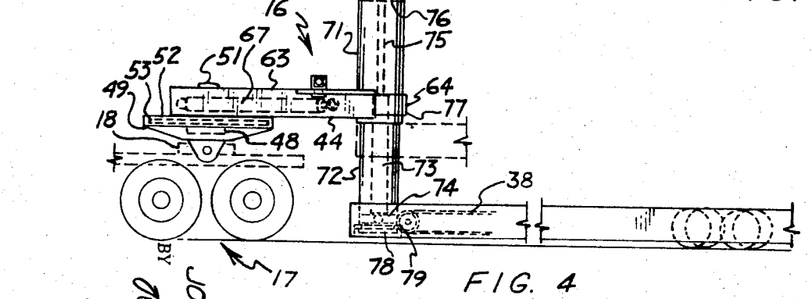
FIGURE 4, an elevation view of the front end of the vehicle of FIGURES 1 through 3, with a section removed, and showing the wheels in retracted position and the main beams in a lowered position.
Figure 5:
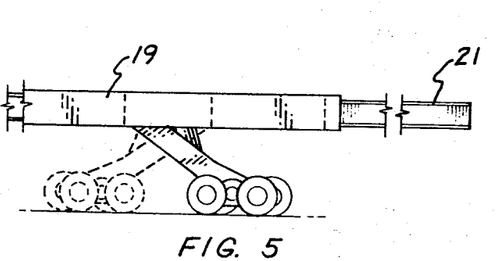
FIGURE 5, an elevational view of the rear section of the vehicle of FIGURES 1 through 4, with the wheels in extended position and illustrating the castering effect.

In the embodiment shown in the drawings, the yoke 16 is V-shaped and formed to spread its legs as well as to lengthen its legs to provide lateral adjustment of the V opening. Since the yoke is attached to the forward end of the main support beams, this adjustment provides an adjustment of the width of the overall vehicle. As best seen in FIGURES 1, 3 and 4, the yoke comprises a pivotal attaching means 43 hereinafter referred to as turntable assembly 43, legs 44 and 46 hereinafter referred to as minor bolster 44 and major bolster 46, and auxiliary elevator means 47 serving to connect each of the bolsters 44 and 46 to the forward end of main support beams 14 and 13 respectively, as well as to adjust the elevation of the forward ends of each beam 13 and 14.

The turntable asembly is constructed to provide the usual pivotal connection now used for hauling heavy trailers in combination with spreadable major and minor bolsters. As here shown the turntable comprises a fifth wheel table universal joint 48 adapted to fit in the fifth wheel 18, a major turntable 49 operatively connected to the fifth wheel universal joint and including a pin 51 centrally located and attached to the major turntable, and a minor turntable 52 fitting within the major turntable and around pin 51 for relative rotation thereto. As best seen in FIGURE 4, the major turntable has an upstanding and internally disposed flange 53, which serves to hold the minor turntable in position and to provide an area of attachment between the flange's upper face and the major bolster 46. The major bolster is also attached to the pin 51 to provide two areas of attachment and a strong connection. The minor bolster 44 is attached to the upper face of the minor turntable 52 by welding or the like, but it should be raised at the area of attachment an amount sufficient to clear the flange of the major bolster.

The contacting surfaces between the major and minor turntables are constructed as bearing surfaces or they contain suitable bearings so that the turntables can pivot with respect to one another. Since the whole turntable assembly can pivot on the prime mover, the relative positions of the major and minor bolsters can be adjusted as desired.

While the turntable construction is shown for a V-type yoke, it will be appreciated that the same structure would be suitable for an X-frame or a Y-shaped yoke with the pivots operating in the manner illustrated.

Each of the legs or bolsters 44 and 46 are similarly constructed, so the description for minor bolster 44 will also illustrate the internal construction of major bolster 46. As shown in FIGURE 1, the bolsters are preferably box-shaped, and move between a maximum spread as illustrated in FIGURE 1 and a minimum spread slightly closer than the spread shown in FIGURE 3. This spread is held and adjusted by adjustable spread member 54, which is formed with two sections telescoping into each other, and which carries an adjustable holding element within.

As here shown, the adjustable spread member 54 comprises an inner member 56 pivotally attached to the major bolster 46 through pivot pin 57, outer member 58 pivotally attached to the minor bolster 44 through pivot pin 59 at one end and telescoping over the inner member 56 at the other end, and hydraulic cylinder 61 carried within members 56 and 58, with the hydraulic cylinder having a piston rod 62 attached to member 56 and the main body of the cylinder attached to member 58. The cylinder may be constructed with a typical piston of simply two sealed sleeves so that the adjustment of the length of spread member 54 is determined by the amount of liquid in the cylinder. If desired, the adjusted position, may be fixed by locking the members in adjusted position by any suitable locking means (not shown).

Although the adjustment of adjustable spread member 54 is shown with a hydraulic control, it will be appreciated that the inner and outer members could be adjusted by other means. For example, they could be adjusted by a screw turned by an electric motor geared down through a worm gear or the like. The important feature resides in the combination of the pivot fastening through the turntable assembly and the adjustable spread member.

In some cases, the adjustment provided by the pivot of the major and minor connecting bolsters will be sufficient to adjust the spacing of the main support beams from each other. However, the preferred form utilizes this adjustment in combination with the adjustment achieved by providing a major and minor bolster of adjustable length. In the embodiment shown in the drawings, the major and minor bolsters are adjustable, although shown in the short length in all views.

As mentioned, the major bolster 46 and minor bolster 44 are similarly constructed, and the discussion herein given for bolster 44 will apply to both. Bolster 44 comprises an outer box-shaped sleeve 63 attached to the turntable assembly, an inner bifurcated member 64 attached to the auxiliary elevator means 47 and having its bifurcated end 66 fitting in telescoping relation within the sleeve 63, and hydraulic cylinder 67 formed with fluid controlled sliding members 68 and 69 with member 68 attached to the sleeve and member 69 attached to the bifurcated member in the usual fashion for hydraulic cylinders.

While the embodiment shown in the drawings illustrates adjustable major and minor bolsters using hydraulic cylinders to effect the adjustment, it will be appreciated that the adjustment could be effected by other powered means such as a screw driven by an electric motor. In both cases the powered units are small and fit easily into the bolsters, while the energy for the units can be provided from the prime mover through conduits or wires.

As here shown, the auxiliary elevator units 47 comprise an outer cylindric sleeve 71, an inner cylinder sleeve 72, and a hydraulic cylinder 73 attached to adjust the telescoping position of the cylindric sleeves. The cylinder 73 is a conventional form of hydraulic cylinder having its main body connected to the inner cylindric sleeve through connecting member 74 and its rod 75 connected to the outer cylindric sleeve 71 through connecting member 76.

The lower end of the outer cylindric sleeve 71 is attached to its bolster by a firm attachment to the bifurcated member through a girdle end 77 thereof. The lower end of the inner cylindric sleeve 72 is attached to the forward end of its corresponding main support beam by a swivel attachmet obtained by a flanged foot element 78 held in position by base flange keeper 79. In this way, the inner cylindric sleeve will raise its corresponding support beam through the flanged foot 78, yet the attachment allows a free swivel to permit the lateral adjustment of the main support beams and still maintain the desired parallel alignment.

It will be noted that during operation the transport vehicle and load is drawn through the yoke only when the main support beams are raised to the position shown in phantom in FIGURE 4. In this position, the yoke and beams are close together and the drawing forces are easily transferred from the prime mover to the support beams. If desired, auxiliary locking means (not shown) can be provided to fasten these elements more closely together.

Although the auxiliary elevator means are shown at the point of attachment between the yoke and the main support beams, it will be appreciated that the auxiliary elevator means could be placed above the pivot point at the fifth wheel, such positioning would allow for the use of a single rather than double elevator unit, however, the embodiment herein shown has the advantage that minimal draying stress is passed through the auxiliary elevator means, and the auxiliary elevator units may be smaller because the lift is distributed between multiple units.

So far, the basic beam structure and yoke of the transport vehicle shown in the drawings has been described. However, it will be appreciated that the special wheel units and their associated elevator means are very important. These wheel units are mounted in the carriage housings 24 (see FIGURE 3), and the wheels are constructed to retract into spaces 81 formed in the main beams with each space located rearward of each of the carriage housings. The wheel units are preferably constructed to be removable to facilitate repair of parts, and to allow the vehicle to be "tailored" for each job by allowing the operator to use various numbers and placements of wheel units.

Figure 8:
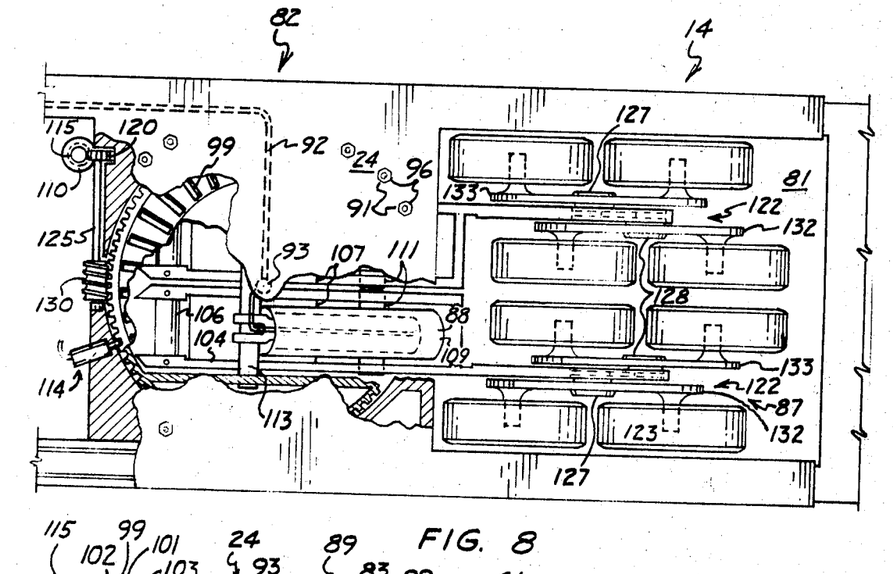
FIGURE 8, an enlarged plan view of one of the steered caster wheel assemblies of the transport vehicle of FIGURE 1.
Figures 9, 10:
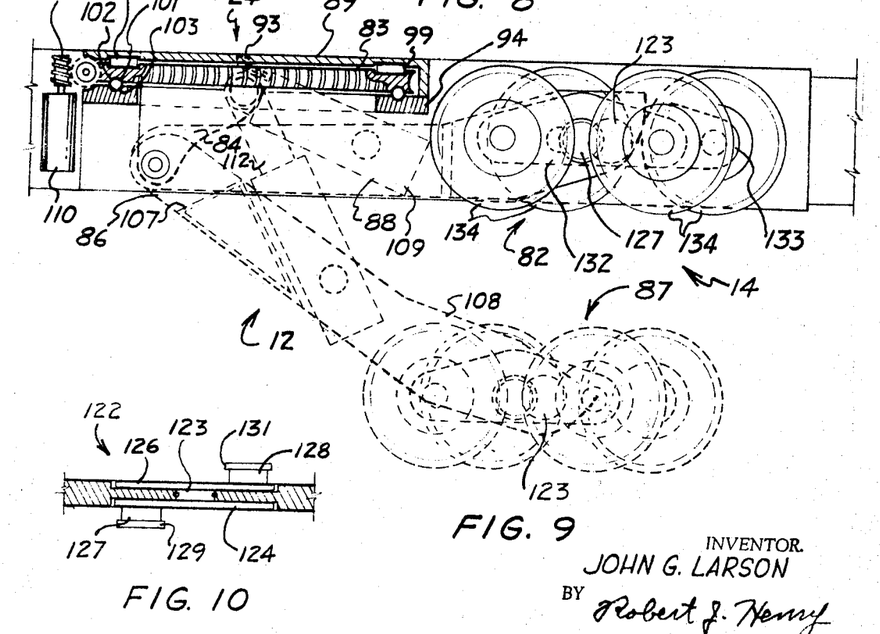
FIGURE 9, an elevational view of the wheel assembly shown in FIGURE 8.
FIGURE 10, a plan view of a crank used in the wheel assembly shown herein.

In general, it is preferred to provide wheel units formed for simple castering in combination with wheels units which are steered. For excellent control, one of the wheel units of each of the two main support beams will be steered, and this will be a central wheel unit where three or more wheel units are used, or the forward wheel unit when two wheel units are provided on each beam. In FIGURES 8 and 9, there is shown a typical steered wheel unit constructed according to the invention, and it will be appreciated that it also illustrates the non-steered wheel unit because conversion thereto is achieved simply by removing the steering drive.

Referring to FIGURES 8 and 9 in greater detail, there is shown a steered wheel unit 82, comprising a disc or drum 83, a pair of depending supports 84, a pair of swing frames 86 pivotally carried on supports 84 for pivoting in a vertical plane, a pair of wheel assemblies 87 carried on the swing frame for movement with the swing frame in said vertical plane, and a pair of hydraulic cylinders 88 each pivotally connected to the drum 83 at one end and to one of the swing frames at the the other.

Each carriage housing 24 is constructed to receive and hold a wheel unit 82, and comprises a generally rectangular plate 89 secured to each of the sections of the main support beam on which it is mounted by welding or the like, and a circular depending flange 91 secured to or integral with the lower surface thereof to form a well sized to receive the disc or drum 83 of the wheel unit 82. The plate of the carriage housing is formed with suitable passages such as passage 92 for bringing hydraulic fluid from one of the conduits 29 to a swivel fitting 93 located in the center of the unit so as to connect the rotatable line of the wheel unit with the fixed line on the vehicle.

In order to secure the disc 83 in position within the well formed by flange 91, a retainer 94 is fastened to the flange 91. This retainer is in the form of a rectangular plate similar in size to the carriage housing but formed to fit between the members of the main support beam. The retainer has a circular cutout in the central portion in order to allow the depending supports 84 to pass therethrough and revolve through a complete circle with the wheel unit. The retainer may be secured by any suitable removable fastening means, and, as here shown, it is secured by bolts 96 fitting in suitable recesses 97 in the carriage housing and adapted to engage into threaded holes in the retainer. If desired, a suitable soft metal shim may be placed between the retainer and carriage housing so that the pressure holding the disc can be adjusted by tightening with a tension wrench or the like.

In order to provide rotational motion for the disc 83 of the wheel unit, suitable bearings surfaces are provided in the carriage housing and the retainer. As here shown, needle race 99 is interposed between the upper surface of disc 83 and the lower surface of carriage housing 24. The needle bearings of the needle race are constructed to facilitate relative rotation between the disc and the housing, and should be accurately located in suitable keeper means or grooves to maintain proper circular alignment. The needle race provides a low friction condition for the desired relative rotation, and at the same time, it provides excellent strength for the high vertical thrust which must be carried.

In addition to the vertical thrust handled by the needle race, there is a horizontal vector required to transmit the draying force, and there is also vertical thrust on the lower side of the disc. These forces are held through ball bearing assembly 101, which is held in groove 102 on the lower surface of the disc 83 and in groove 103 on the upper surface of the retainer 94. With his construction, the resultant vector is held with the direction of the vector being changeable with stress conditions, yet relative rotation between the retainer and disc is accommodated. It will be appreciated that the thrust on the lower side of the disc will depend somewhat on how tight the retainer is fastened to the carriage housing, and this is why it is preferred to use accurate methods for securing it.

From the foregoing description, it is seen that the wheeled unit 82 is held for rotation about a vertical axis through the disc or drum 83. In FIGURES 8 and 9, the disc or drum is in the form of a gear which is driven forward or reverse for steering. However, it will be appreciated that when the unit is not to be steered that the gear teeth may be omitted from the disc for the sake of economy.

The disc 83 is driven for steering by a motor 110 drivingly connected to the disc by a suitable reduction gear chain. As here shown, motor 110 has a worm gear 115 mounted on its shaft, and this gear drives spur worm gear 120 which is pinned to a rotatable shaft 125. Shaft 125 has a worm gear 130 mounted in position to engage the teeth of disc 83 and drive the disc and associated wheels to effect steering. In the form here shown, each caster position is constructed for steering if desired, and equipped with a drive system. Accordingly, gear 130 is preferably mounted for removal or movement to a disengaged position. Motor 130 may be an electric motor, or a hydraulic motor as here shown so that a small easily controlled motor is provided. The large gear reduction accomplished by the worm gears not only allow a small motor to be used, but it also provides for accurate positioning and frictional holding of the steered caster.

The depending supports 84 of the disc 83 may each be in any suitable form for providing a pivot support for the associated swing frame 86. In the embodiment shown, the supports are in the form of stanchions adapted to fit between arms 104 of the bifurcated swing frame 86, and constructed to hold the swing frame in pivotal relation by a pin 106. The swing frames each comprise the arms 104 held in a parallel position by a cross frame 107 formed to locate the hydraulic cylinder 88 between arms 104, and a lower arm 108 adapted to carry the associated wheel assembly 87.

The hydraulic cylinder 88 is used to adjust the swing position of the swing frame, and thereby adjust the vertical position of the wheel unit carried on the end of the swing frame. As here shown, the hydraulic cylinder comprises a cylinder housing 109 equipped with trunnion pins 111 on each side journaled within each arm 104 of the swing frame; and a piston and connecting rod assembly 112 pivotally connected at its end through pin 173 held by stanchions 84 centrally located on the lower surface of disc 83. It will be noted that the swing frame configuration is made to allow all of the desired movements, and the well of the carriage housing is formed to accommodate the swing frame. Preferably the swing frame will rest against the lower well surface of the carriage housing when the wheels are retracted, but this is not essential.

It will be appreciated that the wheel units should be oriented so that the units will fit into recesses 81 when they are retracted. Since some of the wheels are not steered, position locking means 114 are provided which hold the drum in such fixed position. These locking means are important in fixing and holding the drum position for retracting, and for other operations. For example, it is desirable to hold the casters in fixed position for reversing and other special maneuvers. In order to facilitate these special moves, it is proposed to provide for locking in any one of a plurality of positions.

Figure 11:
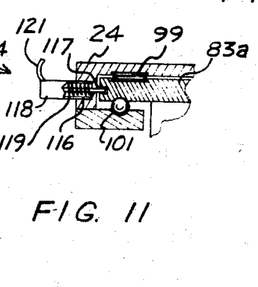
FIGURE 11, a fragmentary sectional elevational view of a part of a free following caster wheel assembly, and FIGURE 12, a diagrammatic view of a typical control system for controlling the operation of the various powered units of the vehicle shown herein.

Referring more particularly to FIGURE 11, there is shown a locking device secured to and fitting within a carriage housing 24 carrying a disc or drum 83a, which is similar to drum 83 except that it has no gear teeth and has one or more recesses 116. Preferably, the disc will have a plurality of the recesses 116 disposed evenly around the periphery thereof, i.e., there could be twenty-four recesses at 15° intervals. The locking means 114 includes a retractable pin 117, positioned to fit into a recess 116 and retract free from the recess. As here shown, the pin is retracted into fluid cylinder 118 by means of spring 119 so as to be normally in a retracted position. When it is desired to lock the drum, the cylinder is powered with fluid pressure through line 121 an amount sufficient to overcome the compression spring and cause the pin to move into the first available recess.

It will be appreciated that other devices could be used to power the pin such as a solenoid structure. However, it is important to use a device that can be controlled at a distance by the operator. The operator has control of the drum position by driving maneuvers, and he can position the pin as desired by proper manipulation of the vehicle. In order to assist the operator, a signal device could be provided to indicate the position of each caster. By the same token a signal device could be provided to indicate locked and unlocked positions of the locking means.

Referring again to FIGURES 8 and 9, it is seen that the wheel units 82 each have eight wheels mounted on two swing frames. Each associated pair of swing frames are generally kept under the same fluid pressure so that each wheel cluster can swing up and down with respect to one another. In other words, the hydraulic liquid can flow between the cylinders. In addition, an air dome accumulator can be used for damping, if desired. Moreover, each four wheel cluster is mounted on the swing frame for pivoting motion so that some wheels will move down while others move up. In fact, each wheel is mounted in such a way that each wheel can find a level and balance the forces.

All four wheels of each cluster are carried on a crank 122 shown in plan view in FIGURE 10. As there shown, the crank comprises a central hub 123 formed to serve as a bearing, crank arms 124 and 126, and outer hubs 127 and 128 carried on crank arms 124 and 126 respectively. Hubs 127 and 128 are also formed to serve as bearings, and are preferably constructed for easy disassembly. For example, hubs 127 and 128 may each have hub flanges 129 and 131 threaded into the hubs, or otherwise bolted in position. Similarly, crank arm 124 is removable from hub 123. In this way, the units are formed for easy repair of tires or the like.

The crank 122 is journaled through the lower end of the associated swing frame with its central hub 123 fitting therein and the crank is free to pivot around a horizontal axis. This allows the whole cluster of four wheels to find an overall level from front to back as the wheels are retracted. At the same time, the crank is free to undergo the same pivot, and pivoting of the crank (which is normally horizontal) will bring one outer hub up and the other outer hub down. In this way side-by-side leveling is accomplished, as will be more apparent hereinafter.

On each outer hub of the crank, a rocker is mounted and each rocker has a pair of wheels mounted thereon, so that the wheel pair on each rocker is in tandem relation. Thus it is seen in FIGURE 8 that a rocker 132 is mounted on outer hub 127 for pivoting thereon, while rocker 133 is mounted on outer hub 128 in similar fashion. Each rocker carries two wheels 134 as indicated above. With this suspension, it is seen that each tandem pair of wheels is free to find a relative level by the action of its associated rocker while the side-by-side leveling is achieved through the crank 122. At the same time leveling of the whole is achieved by the pivot of the swing frame. Relative leveling of the clusters of four on each swing frame is achieved through flow of fluid between the two cylinders operating the swing frames.

From the above discussion, it is seen that all eight wheels of each caster are self-compensating for bringing substantially equal pressure on each wheel when the wheels are travelling over rough contours. It is also a feature of this invention to control fluid pressures to each of the casters, and when feasible, utilize the same forces on each wheel. This is achieved by placement of the individual caster to be used, according to the load to be carried, and controlling the various movable elements from the common control box or console 31. In this way, leveling (both laterally and longitudinally) of the vehicle can be achieved either during transit or when the vehicle is stationary.

Figure 12:
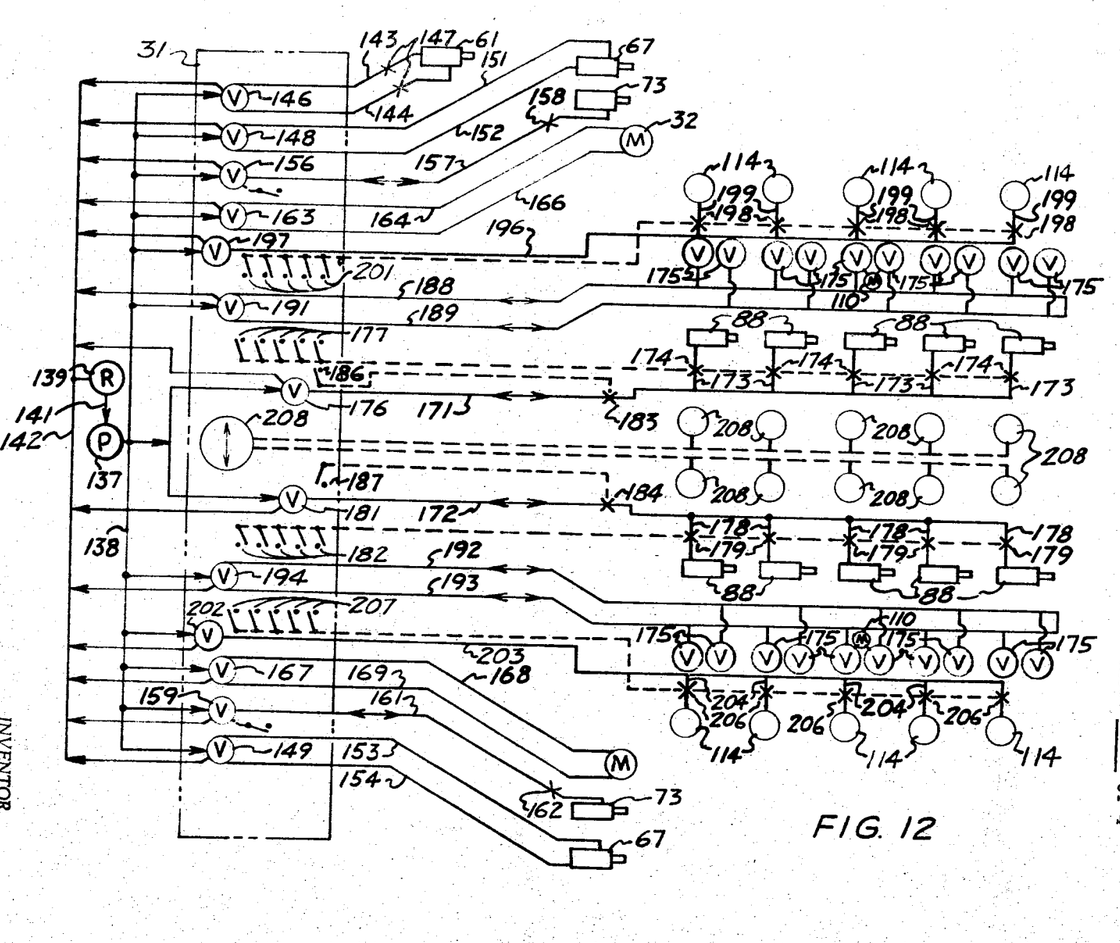

A typical control system is shown in FIGURE 12, which is suitable for a vehicle capable of carrying five caster wheel units on each main support beam or a total of ten wheel units. This control system is suitable for the vehicle shown in FIGURES 1 through 11, but it will be appreciated that smaller numbers of caster wheel units can be used and the unused lines simply shutoff.

As here shown, the controls are located in the console 31 where they are all in a close relation available for the operator. With this construction, he can operate all the controls, from a fixed position, and coordinate their operation. While the powered components are fluid driven in the device shown, it will be appreciated that certain of the units can be electrically powered with motors by simple substitution and conventional circuitry.

Referring more particularly to FIGURE 12, there is shown a diagram of the preferred hydraulic system which comprises a pump 137 for providing liquid under pressure to main line 138 which in turn leads to the various components either directly or through branch lines. The pump receives liquid from reservoir 139 through intake line 141, and liquid is returned to the reservoir through main return line 142, which in turn is in communication with the various powered components.

As here shown at the upper end of the drawing, the hydraulic cylinder 61 of the spreader carried on the yoke is a double acting cylinder with power depending on which feed line 143 or 144 the main line is connected to. This connection is controlled by the switching valve 146, which connects main line 138 to line 143 and line 144 to main return line 142 in one position, and which connects main line 138 to line 144 and line 143 to main return line 142 in another position. Thus control of valve 146 provides a driving direction as desired until the proper spread is obtained. When the desired spread is thus obtained, solenoid valves 147 are closed to block the cylinder out of the supply system and hold the position. However, it will be appreciated that mechanical locks could be used, if desired.

As indicated above, the lateral spacing of the main support beams at the yoke are not only adjusted by the spreader, but also by adjustment of the length of the major and minor bolsters. These bolsters are adjusted by their hydraulic cylinders 67, and, as here shown, the cylinders are independently adjustable by operation of switching valves 148 and 149. The valves 148 and 149 are similar to valve 146, but have an "off" position also. Thus valve 148 can direct fluid power through either feed line 151 or 152 while connecting the other line to the return line. Similarly, valve 149 can direct fluid through either feed line 153 or 154 with the other line being connected to return line 142.

For the convenience of the operator, the various controls for the left side of the vehicle and right side of the vehicle are symmetrically disposed on similar sides of the console. Thus valve 148 controls the bolster on the left and valve 149 controls the bolster on the right. It will also be appreciated that solenoid locking valves could be provided, if desired.

The other powered units on the yoke consists of the cylinders 73 on the right and left elements of the auxiliary elevator means. These cylinders are powered for lift only, and when it is desired to lower the auxiliary elevators, the fluid is simply returned and the beams come down under their own weight. Thus control for the left auxiliary elevator is effected with valve 156, which connects the single feed line 157 to either the main power line 138 or the main return line 142. The cylinder can be held in position by providing an "off" position for valve 156 or by providing a solvent valve 158 in feed line 157 as here shown. The right auxiliary elevator is controlled in similar manner with valve 159, single feed line 161 and solenoid 162 functioning the same as the valve 156, single feed line 157 and solenoid 158 respectively.

In the embodiment here shown, the right and left extensions are powered by fluid motors 32 which operate in either forward or reverse from the fluid power provided by pump 137. Thus the left motor 32 is controlled by valve 163 which connects the main line 138 from pump 137 to either feed line 164 or 166 to effect driving in either direction. When one of the feed lines 164 and 166 is connected to main line 138, the other is connected to main return line 142. Since the motor drives through a considerable reduction through worm gears, a separate valve is not needed, and valve 163 is simply moved to an "off" position so that neither supply of return line is connected to the feed line.

The right extension operates in similar fashion as the left extension with valve 167 operating to connect feed lines 168 and 169 in the same way that valve 163 operates to connect feed lines 164 and 166 to the main supply line and return line. Although the right and left controls are similarly constructed, it will be appreciated that they operate independently so that one extension may be moved in a different manner than the other, if desired.

The elevator means in the device shown comprises a pair of single acting hydraulic cylinders 88 on each drum for providing powered extension and self-retraction of the wheel clusters. These cylinders are powered in one direction to extend the wheels, and retraction is accomplished by switching the fluid flow to the reservoir and allowing gravity to force the retraction. However, it will be appreciated that double acting cylinders could be used in certain forms of the invention, as well as spring returns, spring assisted extension, and other variations.

As shown in FIGURE 11, the cylinders 88 on each bank are provided with feed lines, with the left bank being supplied by feed line 171 and the right bank being supplied by feed line 172. The flow of fluid toward and away from each individual cylinder 88 is achieved by inserting a valve in a branch feed line leading to each drum. Thus each of the left bank of five drums equipped with a pair of cylinders 88 has its cylinders supplied through the branch feed lines 173, which in turn are each controlled by a valve 174. The control of the direction of fluid flow for the left bank is achieved by valve 176, which connects the feed line 171 to either the main supply line 138 or the main return line 142. Each of the five valves 174 are controlled independently by one of the five switches 177. These switches are designed to operate electrically controlled valves 174, through a solenoid or the like.

The right bank is similar to the left bank with feed line 172 leading to five branch feed lines 178, each having a valve 179 disposed therein. The direction of fluid flow in main feed line 172 is controlled by the switching valve 181, and control to each cylinder is maintained by operation of switches 182 which operate the valves 179. Each main branch feed line 171 and 172 is also equipped with a main valve 183 and 184 respectively, with valve 183 being controlled by switch 186, and valve 184 being controlled by switch 187.

It will be appreciated that the controls here shown simply illustrate the operation necessary to the best use of the device shown, and that various changes and improvements can be effected, as desired. For example, more sophisticated elements could be used for more control if the intended use of the vehicle made such elements practical. It will also be noted that five drums are serviced by the controls here shown, although it has been stated that a smaller number of drums may be used simply by removal of certain of the drums or by not supplying certain of the drums in the first place. In such cases, the lines are simply closed off, and the controls for the same not used or locked in the closed position. Similarly, large numbers of drums could be used by mounting additional carriage housings 24. These could be of a demountable or removable type, which would fasten by bolts or other suitable means to the main beams or extensions.

As here shown, a steering control is also provided for each drum, although it is preferred to steer only one drum on each bank. However, it is preferred to be able to select the drum to be steered from any of the drums available so suitable lines are provided to each. With this arrangement, it is contemplated that four of the five lines of each bank will be turned off through suitable valves and only one line used. Alternatively, individual controls could be used as shown and described for the locking means.

In the form here shown, each central drum is provided with a steering motor 110 powered in a forward and reverse direction by liquid from main supply line 138. The left bank of motors are supplied by feed lines 188 and 189 which in turn are controlled by switching valve 194. Since only one motor is normally used in each bank at a time and the gearing provides frictional braking, the unused positions are turned off by manual 175, while the manual valves leading to the motor 110 are turned on.

Each carriage housing is also equipped with a locking means 114, although the steered drum and the carriage housings which are empty will not be locked. Once again, only the locking devices selected for the desired operation are put in service, but each position has capability to allow latitude in the programing of the device.

As here shown, each of the locking means 114 comprises a spring loaded hydraulic cylinder which is actuated by fluid power taken from the main supply line 138. For the left bank, the fluid goes through feed line 196 to the cylinder and return depending on the position of the switching valve 197. Each cylinder is separately controlled by a valve 198 disposed in branch feed line 199, with each valve being controlled by a switch 201. Similarly the right bank contains main switching valve 202 operating feed line 203 which leads to branch feed lines 204 to supply power to the cylinders of locking means 114. The branch feed lines 204 are each independently controlled by valves 206 operated by switches 207 as in the left bank.

Although the controls described so far will provide all the important controls, it is also advantageous to provide means for coordinating the steering of the caster in the left bank with that in the right bank so they operate together. In the device here shown, this is achieved by the operator who has a steering indicator 208 equipped with hands to show the position of both the right and left hand steered drum. The hands are positioned by connecting one of the five sensors 208 which is designed to operate electrically by sensing a position of a resistor (not shown) carried on the steered drum or drive therefor. Such sensing devices are known to those skilled in the art, and it is not believed necessary to show any particular device, since any suitable device could be used. In addition, it will be appreciated that the drum could be steered electrically and the hydraulic motors replaced by selsyn motor. In such cases, steering or one motor is automatically followed by the other and parallel alignment positively assured.

From the foregoing, it will be appreciated that the controls shown are simply illustrative and any known systems for controlling hydraulic and electrically powered units may be used in a manner consistent with the desired function of the vehicle.

In operation, the particular transport job will be analysed and the machine programmed (by using the desired number and position of drums) to handle the load and distribute it over a satisfactory area. For example, let us assume a substantially rectangular building such as a house is to be moved, and six caster units are deemed proper with the rear three carriage housings on each side to be used to balance the load so that some of the load will be held by the prime mover through the yoke. Preferably, a rather large proportion of the load is placed on the prime mover to assist in braking the vehicle. For best control, the center caster of each bank will be steered, and the vehicle is so equipped.

The house is also prepared by knocking out appropriate holes in the understructure or excavating as is necessary to receive each beam under the locations to be supported. It will be appreciated that the beam structure of this vehicle minimizes such preparation, because only the essential locations must be prepared.

The transport vehicle is drawn to the house location as a trailer with its dimensions being minimized. At the house location, the main support beams are spread by special steering and/or backing and expanding the yoke spread until the width desired for loading is obtained. The wheels are then retracted and the support beams lowered. The rear extensions are then expanded to full length under the house and the rear ends thereof anchored by any suitable means. The vehicle is then backed up while retracting the rear extensions using the power of the extension drive system, the prime mover, or both. After one or more extending and contracting procedures, the main beams are in position. This extending and retracting procedure allows for accurate placement of the main beams in the exact desired position under the house, because the extensions lead the way. The extensions are then moved to the desired length, and the wheels are extended under power. At the same time the auxiliary elevator means in the yoke are powered for lift.

Since the various lifts are hydraulic, the operator can "feel" the load, through appropriate pressure indicators, and bring the vehicle slowly through the lifting operation so as to lift the house without damage thereto.

With the house in place, the transport is moved to the installation position. During the trip, it will be appreciated that the wheel suspensions and rear steering will allow safe, smooth travel over rough terrain and allow difficult turns to be made. When the house reaches its destination, the wheels and auxiliary elevators are retracted carefully to set the house gently in place. The vehicle is then pulled out from under the house, and prepared for the next job.

Although movement of a rectangular house was described, it will be appreciated that an L-shaped house could be moved easily with the vehicle of this invention by using cross-frames inserted through the holes in the main beams to engage the offset.

The vehicle of this invention can also be used to move heavy items such as machinery off of flat cars by the following procedure:

The machine is again programmed according to the size and weight of the load to be removed from the flat car. In a typical case, the load will be short enough that the extensions will remain in retracted position, yet the load heavy enough to use ten casters. The vehicle is then equipped with the ten caster units, with the central caster of each bank usually connected for steering. However, it will be appreciated that in some cases more than one caster from each beam might be steered.

The vehicle is then spread an amount just sufficient to allow the beams to straddle the flat car, and either the vehicle is backed into position or the flat car is backed into the resulting "bay." The load is usually held on the flat car on supports and in some cases, it will overlap the sides of the car, as with "lifting ears." In such cases, the vehicle can be used to pick up the load directly without adding additional lateral supports, or cross-framing. After the appropriate preparation, the wheels are extended and the load lifted above the flat car.

With the load thus lifted, the car or vehicle is moved to clear the area under the load. In some cases, particularly where the load need not be moved very far, the transport may make the move without further preparation. However, further preparation is often desirable. This might consist of placing suitable supports under the load or cross frames and retracting the wheels to let the load rest on the supports. The vehicle will then preferably be closed to an optimum width after which it will re-engage the load for transport to destination. Reversing the procedure would permit loading and installation function.

After the load is removed from the flat car, but before transport, it may be desirable to hold the two forward wheel units in retracted position to throw more weight on the prime mover. It will also be appreciated that other special techniques will be apparent to the operator, and that various additional units such as the use of removable castered units on the extensions could be used, if desired. For example, auxiliary wheel units similar to those on the main support beams could be bolted on the extensions and auxiliary hydraulic lines coupled from appropriate valves or fees in the main supply lines.

When the load reaches its destination, the receiving site is prepared to assist the vehicle in placing the load in the desired location. It will also be appreciated that loads to be handled by the vehicle of this invention can be specially loaded onto the flat car to facilitate handling much the same way as loads are prepared for the usual forklift trucks. In fact, it will be appreciated that in many ways the vehicle of this invention is similar to a very large forklift specially constructed to handle extra large loads.

From the foregoing description, it is seen that I have provided a novel transport vehicle which is capable of handling very large and/or heavy loads, and which is capable of self-loading and unloading together with improved transit ability.

I claim:

1. A transport vehicle for moving heavy articles, comprising a pair of main support beams for providing supporting surfaces on which the articles to be moved is to be rested, said main support beams being disposed in substantially parallel relation with the distance between the beams being adjustable and each of the main support beams being constructed with telescoping sections whereby the length of each beam may be independently adjusted, elevated means for raising and lowering the support beams whereby the beams may be inserted under the article to be moved and raised to lift the article to be moved into a supporting position for movement with the vehicle, and retractable wheel assembly means on each support beam for facilitating movement of the empty and loaded vehicle, said wheel assembly means including at least one wheel assembly mounted for rotation about a vertical axis for providing movement of the vehicle in any direction.

2. The transport vehicle defined in claim 1, in which each wheel assembly is carried on a caster type mounting with the effective wheel support center being off-set from the vertical axis of rotation.

3. The transport vehicle defined in claim 2, in which the elevator means includes a plurality of fluid cylinders operatively connected to power the retractable wheel assemblies.

4. The transport vehicle defined in claim 2, in which each of the support beams contains a main section constructed with at least one well-like housing, and in which each wheel assembly comprises a drum constructed to fit into one of said well-like housings and to be rotatably carried therein, swing frame means including at least one swing frame, and a fluid cylinder carried on said drum and attached to said swing frame for adjusting the angular position of the swing frame with respect to the support beams whereby the wheel cluster may be retracted to an out-of-the-way position and extend into an operative position at any of various heights, said fluid cylinder serving as a part of the elevator means for raising and lowering the vehicle.

5. The transport vehicle defined in claim 4, in which the wheel cluster comprises a crank-shaped axle pivotally carried on the swing frame, and pair of wheel support elements pivotally mounted on the axle on each side of the swing frame.

6. The transport vehicle defined in claim 5, in which each drum has a pair of swing frames, a pair of fluid cylinders operatively associated with each swing frame, and a pair of wheel clusters, each of said wheel clusters being carried on a swing frame.

7. The transport vehicle defined in claim 4, in which at least one of the wheel assemblies is equipped with powered steering means for adjusting the angular relation of the assembly with respect to the well housing in which it is carried for adjusting the angular relation of the assembly with respect to the support beams to provide controlled steering to the vehicle.

8. The transport vehicle defined in claim 7, in which two wheel assemblies are constructed for controlled steering with each steered wheel assembly being on a different support beam than the other, and in which means are provided to synchronize the steering of the two steered wheel assemblies whereby they may be steered in parallel alignment.

9. The transport vehicle defined in claim 7, in which the powered steering means comprises a fluid motor, and a gear chain disposed in driving relation between the motor and the drum of the steered wheel assembly, said drum being constructed with gear teeth to receive power from the gear chain.

10. The transport vehicle defined in claim 7, in which at least one of the wheel assemblies on each main beam is equipped with releasable locking means constructed to hold the wheel assemblies from free rotation and provide a locked position aligned for retraction on the wheel assembly, said wheel assemblies equipped with said locking means being different assemblies than the assemblies equipped with steering means.

11. The transport vehicle defined in claim 2, in which powered extension means are provided on each main support beam to drive the telescoping sections of the beams into the desired adjusted position.

12. The transport vehicle defined in claim 2, in which each of the main beams comprises a pair of longitudinally extending members held in space parallel relation by a plurality of cross members, at least one of said cross members being formed to provide a well housing for a wheel assembly, and said spacing being sufficient to accommodate wheel assemblies in retracted position between the pair of longitudinally extending members.

13. A transport vehicle for moving heavy articles constructed to be drawn by a prime mover, comprising a pair of main support beams for providing supporting surfaces on which the article to be moved is to be rested, a yoke adapted to be carried on the prime mover and connected to said main beams at their forward ends for drawing the transport vehicle along with the prime mover, said yoke being constructed to adjust the width of the points of connection to the main beams whereby the spacing between the main support beams may be adjusted, said yoke also having lift means for raising and lowering the forward ends of the main support beams, a number of retractable wheel assembly means on each of the main support beams, said number being an integer from one to five inclusive, each of said wheel assembly means including at least one wheel cluster mounted for rotation about a vertical axis for providing movement of the vehicle in any direction, and elevator means carried on the retractable wheel assemblies for raising and lowering the main support beams and cooperating with the lift means for raising and lowering the vehicle.

14. The transport vehicle defined in claim 13, in which the yoke is carried on the prime mover with a freely pivoting attachment, and in which the yoke is also attached to the forward ends of each of the main beams through a pivotal attachment.

15. The transport vehicle defined in claim 14, in which the yoke comprises at least one bolster having an adjustable length operatively associated with the main support beams whereby adjustment of the length of the bolster adjusts the spacing of the main beams at their connection to the yoke.

16. The transport vehicle defined in claim 14, in which the yoke comprises a pair of bolsters mounted for relative rotation on a pivotal connection, with one of said bolsters being connected to one of said main support beams and the other of said bolsters being connected to the other of the main support beams, and means for holding the bolsters in an adjusted position of relative rotation.

17. The transport vehicle defined in claim 16, in which each of the bolsters are adjustable as to their length and have powered means to effect the adjustment, and in which the relative pivot of the bolsters is adjusted by a spreader pivotally attached to both bolsters and operative to adjust and hold the desired relative pivot.

18. In a heavy transport vehicle, in combination, a wheel assembly comprising a crank-shaped axle pivotally mounted on the vehicle through a central hub formed in the crank-shaped axle, and a pair of wheel support elements pivotally mounted on said axle on each side of the central hub.

19. The heavy transport vehicle defined in claim 18, in which each wheel support element carries a pair of wheels in tandem relationship, and the crank-shaped axle is normally disposed in a plane substantially parallel to the ground, whereby the wheel assembly has four wheels disposed in a manner permitting the wheels to assume substantially equal loading on ground of irregular contours.

20. The heavy transport vehicle defined in claim 18, in which two wheel support elements are provided, with each wheel support element being mounted on the vehicle through a swing frame, each swing frame being pivotally connected to the vehicle at one end, and each swing frame carrying its crank-shaped axle at the other end.

21. The heavy transport vehicle defined in claim 20, in which each swing frame has a fluid cylinder operatively associated therewith for retracting each of the wheel assemblies.

22. The heavy transport vehicle defined in claim 21, in which the fluid cylinders of each swing frame are connected together through a fluid line for providing variable retraction of the swing frames relative to each other whereby even loading is maintained on uneven terrain.

References Cited

UNITED STATES PATENTS

| | | | |
|---|---|---|---|
| 2,475,443 | 7/1949 | Bill | 280—43.23 |
| 2,706,120 | 4/1955 | Stratton | 280—35 |
| 2,788,145 | 4/1957 | Clark | 280—423 X |
| 2,812,193 | 11/1957 | Grace | 280—423 X |
| 2,893,747 | 7/1959 | Hamblin. | |
| 3,009,711 | 11/1961 | White | 280—43.23 |
| 3,139,288 | 6/1964 | Peterson | 280—34 |
| 3,153,544 | 10/1964 | Jung et al. | 214—512 X |
| 3,229,602 | 1/1966 | Vivier | 280—43.23 X |
| 3,330,574 | 7/1967 | Kulyk | 280—34 |

FOREIGN PATENTS 1,002,633 8/1965 Great Britain.

OTHER REFERENCES

Schulze, H.: German printed application No. 1,184,472, published Dec. 31, 1964.

LEO FRIAGLIA, *Primary Examiner.*

U.S. Cl. X.R.

280—34, 43.23, 81, 415, 423